Patented Sept. 23, 1924.

1,509,411

UNITED STATES PATENT OFFICE.

JOSEPH A. ANGLADA, OF JENKINTOWN, PENNSYLVANIA.

REDUCTION GEARING.

Application filed April 21, 1921. Serial No. 463,428.

*To all whom it may concern:*

Be it known that I, JOSEPH A. ANGLADA, a citizen of the United States, and a resident of Jenkintown, county of Montgomery, and State of Pennsylvania, have invented certain new and useful Improvements in Reduction Gearing, of which the following is a specification.

My invention relates particularly though not exclusively to a form of reduction gearing for motor vehicles where each driven wheel is operated by a separate electric motor.

It has heretofore been proposed to interpose a train of epicyclic gearing between the motor and the road wheel and these constructions while successful, have been somewhat noisy, due apparently to variations between the centers of the motor and wheel under operating conditions, causing the gears to mesh unevenly.

The important objects of this invention are to secure silence of operation, to support the driving and driven elements in definite fixed alinement and to insure uniform meshing of the gears under all conditions.

Another special object is to enable ready access to the gearing and the bearings.

In the accompanying drawings I have illustrated one of the practical commercial embodiments of the invention, but wish it understood that this illustration is primarily for purposes of disclosure and that, therefore, the structure may be modified in various respects without departure from the true spirit and scope of the invention as hereinafter defined and claimed.

Figure 1:
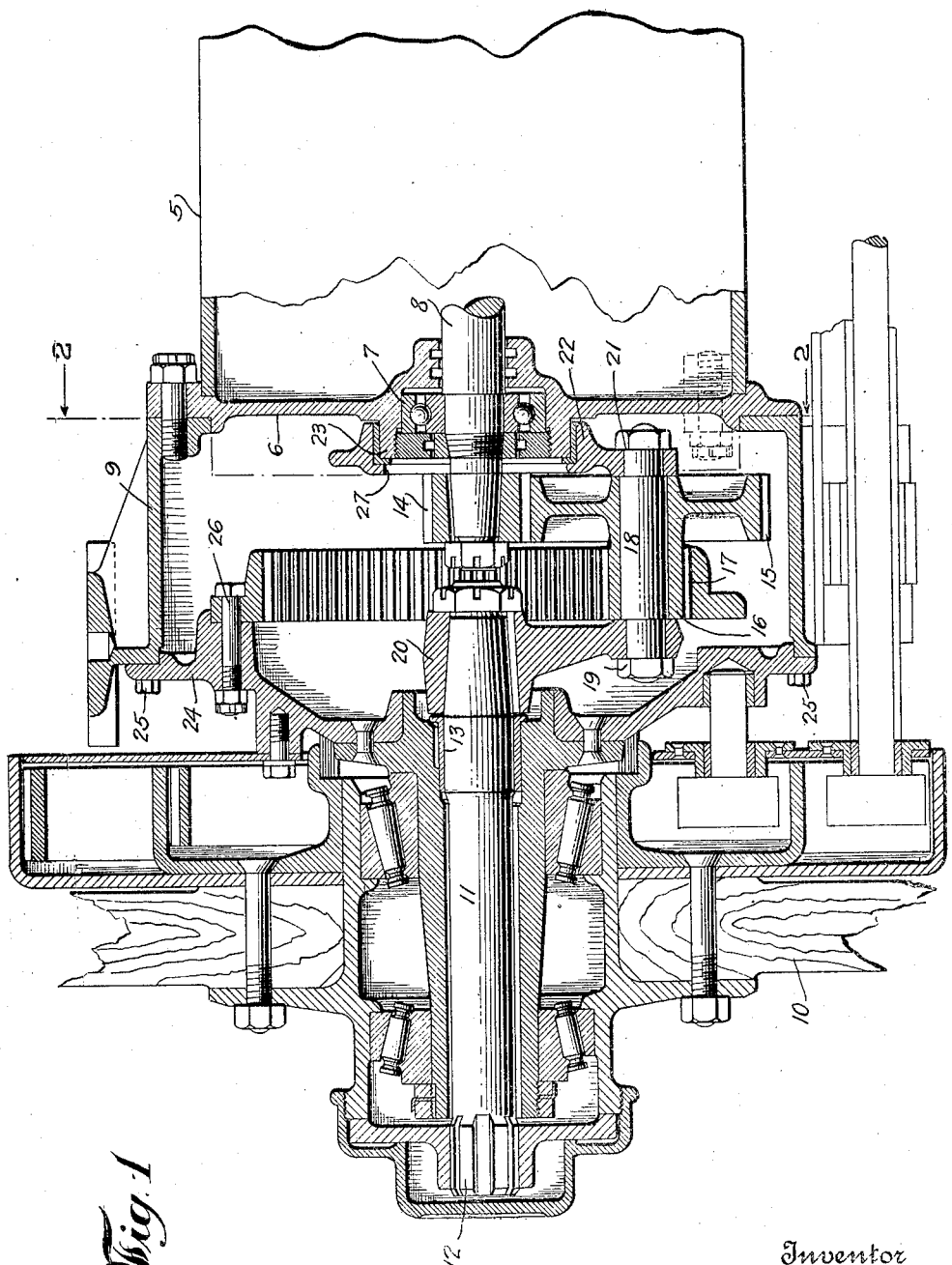

Figure 1 in the drawings referred to is a broken longitudinal sectional view of the gearing as used for the direct drive of a vehicle wheel.

Figure 2:
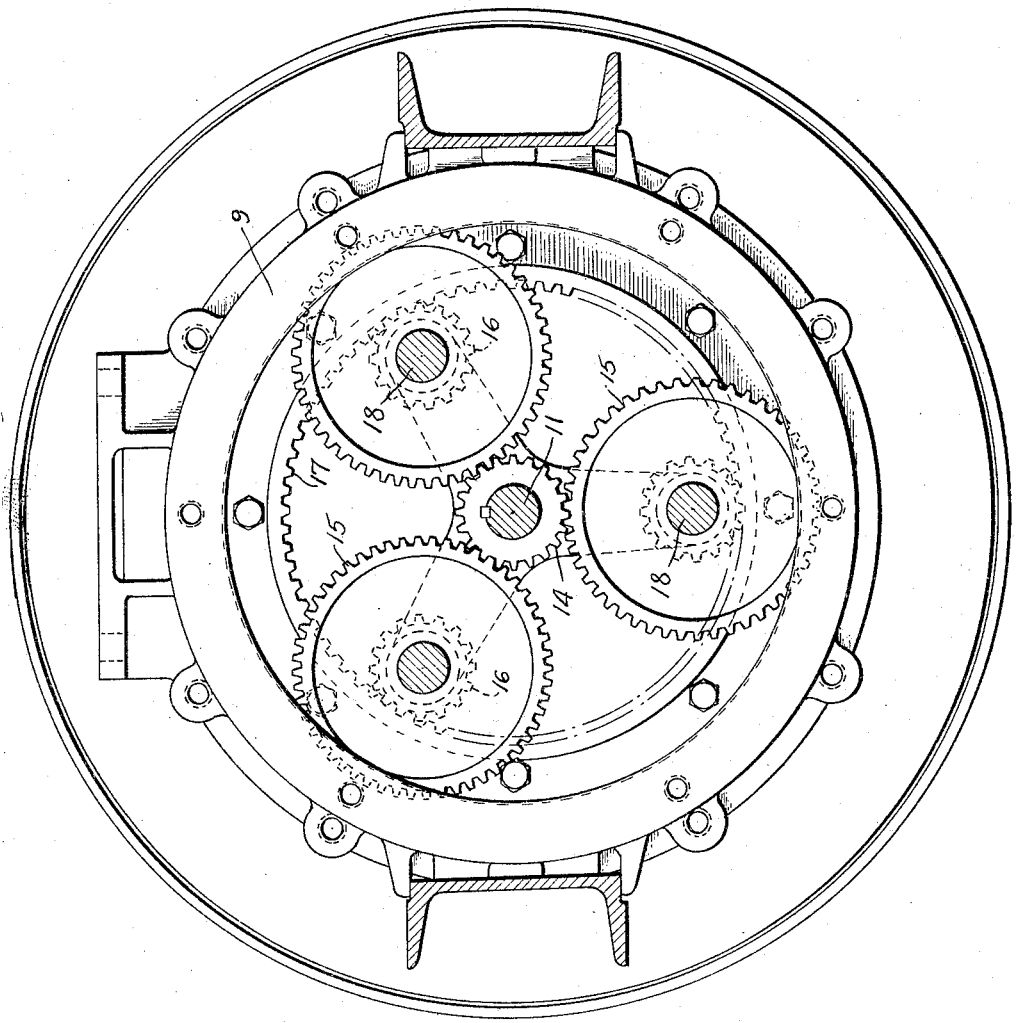

Figure 2 is a transverse sectional view of the same as taken on substantially the plane of line 2—2 of Figure 1.

In the illustration, 5 designates the motor frame having a head 6 carrying a bearing 7 for the armature shaft 8 and attached to a gear housing 9.

10 designates the road wheel, suitably journaled and having a drive shaft 11 keyed to the hub portion of the wheel at 12 and standing in alinement with the motor shaft 8. A special feature of this drive shaft is that it has a bearing at 13 in the outer wall of the gear case directly opposite the bearing 7 of the armature shaft and therefore adapted to maintain said drive shaft in absolute alinement with the armature shaft.

Fixed on the end of the armature shaft is a spur pinion 14 which meshes with gears 15 carrying pinions 16 in mesh with the internal gear 17 which is fixedly secured within the gear case.

The gears 15 with their pinions 16 are journaled on stub shafts 18, and a special feature of these shafts is that they are rigidly held at their opposite ends, being secured at their outer ends at 19 to the arms of a spider 20 which is fixed on the drive shaft 11, and being secured at their inner ends at 21 to a ring or annular support 22 which has a sliding bearing over an annular shoulder or stationary hub 23 carried by the motor head 6.

With this construction it will be seen that the shafts for the planetary gears are rigidly held and supported at both ends, and that said gears are thereby maintained in their predetermined definite relations to the driving pinion 14, and the internal gear 17 at all times and regardless of varying working conditions. The adjacent ends of the motor and drive shaft being supported in fixed bearings and the intermediate gears being all supported in definite relation, it will be seen that the line of connections from the motor to the wheel will be maintained constant and uniform and that the gearing will operate quietly and effectively.

Ready access to the gearing and the shaft bearings is provided for by constructing the outer wall of the gear casing as a removable head 24 detachably secured to the body of the casing by means of bolts at 15, it being apparent that upon the removal of these bolts, the outer head of the gear case may be lifted off, carrying with it the internal ring gear 17 which is affixed to it at 26 and the double spider construction 20—22 with the gears 15, 16 journaled therebetween.

It will be noted that as the member 22 simply has a sliding fit over the stationary guiding and supporting shoulder 23, it will come away with the other parts without any interference, the internal diameter of this ring member at 27 being greater than the driving pinion 14 so as to readily pass thereover.

What I claim is:

1. In gearing of the character disclosed, a gear case having a removable end wall, an internal gear carried by and removable with said end wall, a driven shaft journaled in said removable end wall, a spider carried by the driven shaft, stub shafts carried by said spider, a motor shaft supported in alinement with the drive shaft, a pinion on said motor shaft and gears on the stub shaft in mesh with said pinion and carrying pinions in mesh with the internal gear, all whereby the removal of the end wall of the gear case will effect the removal of the internal and other gears from the driving pinion, and a ring member connecting the free ends of the stub shafts and of larger internal diameter than the driving pinion so as to pass freely thereover in the separation of the parts described.

2. In gearing of the character disclosed, a gear case having a removable end wall, an internal gear carried by and removable with said end wall, a driven shaft journaled in said removable end wall, a spider carried by the driven shaft, stub shafts carried by said spider, a motor shaft supported in alinement with the drive shaft, a pinion on said motor shaft and gears on the stub shaft in mesh with said pinion and carrying pinions in mesh with the internal gear, all whereby the removal of the end wall of the gear case will effect the removal of the internal and other gears from the driving pinion, and a ring member connecting the free ends of the stub shafts and of a larger internal diameter than the driving pinion so as to pass freely thereover in the separation of the parts described and a fixed annular bearing shoulder normally engaged by the ring member.

In witness whereof, I have hereunto set my hand this 19th day of April, 1921.

JOSEPH A. ANGLADA.